United States Patent [19]

Takahashi

[11] 4,382,115

[45] May 3, 1983

[54] FILM COATED WITH SOLUTION CONTAINING A VINYLIDENE CHLORIDE COPOLYMER AND SURFACE ACTIVE AGENT

[75] Inventor: Shigeyuki Takahashi, Amagasaki, Japan

[73] Assignee: Daicel Chemical Industries, Ltd., Sakai, Japan

[21] Appl. No.: 312,069

[22] Filed: Oct. 16, 1981

[30] Foreign Application Priority Data

Oct. 20, 1980 [JP] Japan ................................ 55-146494
Sep. 21, 1981 [JP] Japan ................................ 56-149093

[51] Int. Cl.$^3$ ............................................ B32B 27/40
[52] U.S. Cl. .............................. 428/424.6; 428/475.8; 428/483; 428/510; 428/514; 428/521; 428/518; 428/35; 428/910; 426/118

[58] Field of Search ...................... 428/518, 521, 424.6

[56] References Cited

U.S. PATENT DOCUMENTS

| | | | |
|---|---|---|---|
| 3,850,726 | 11/1974 | Smith et al. .......................... | 428/518 |
| 3,988,500 | 10/1976 | Jahn ..................................... | 428/518 |
| 4,096,946 | 6/1978 | Cook et al. ...................... | 428/518 X |
| 4,115,334 | 9/1978 | Gerow ............................. | 428/518 X |

Primary Examiner—P. Ives
Attorney, Agent, or Firm—Flynn, Thiel, Boutell & Tanis

[57] ABSTRACT

A plastic film is coated with a coating solution containing a vinylidene chloride copolymer and a surface active agent and thereby provided with an excellent gas barrier property to oxygen gas and water vapor, an excellent transparency, and good printability.

5 Claims, No Drawings

FILM COATED WITH SOLUTION CONTAINING A VINYLIDENE CHLORIDE COPOLYMER AND SURFACE ACTIVE AGENT

The present invention relates to a coated film. More particularly, present invention relates to a coated film having a coated surface excellent in the wettability, which is excellent in the gas barrier property to oxygen gas and water vapor and also in transparency.

There is widely known a method in which a medicine or food is wrapped with a film coated with a vinylidene chloride type copolymer resin excellent in the gas barrier property to oxygen gas or water vapor so as to prevent moisture absorption or sublimation in the medicine or to maintain the flavor or prevent discoloration or oxidation in the food. It also is known that the vinylidene chloride type copolymer used as the coating agent includes two types, that is, an aqueous dispersion type and a powder type to be used after dissolution in a solvent.

From the viewpoint of the oxygen gas barrier property of a vinylidene chloride type copolymer resin-coated film, the solvent method using a powder type resin after it has been dissolved in a solvent is advantageous. The reasons are considered as follows.

More specifically, in case of the aqueous dispersion type resin, fine particles of the resin dispersed in the dispersion are fusion-bonded to one another at the drying step conducted after the coating step, and the crystalinity is limited because of the necessity to form a coating layer. Furthermore, a surface active agent, a stabilizer, a polymerization initiator, a catalyst and the like should be incorporated into the dispersion.

In each case, the coated film is printed and laminated with a film of polyethylene, polypropylene or the like, and the laminate is formed into a bag or pouch and then actually used.

Recently, in response to requests for prevention of environmental pollution, aqueous or water-alcohol mixture type lamination adhesives have been used in large quantities, and aqueous printing inks have been put into practical use. Accordingly, development of a coated film having a good wettability (adhesiveness) to such adhesives and printing inks is eagerly desired. When a powder type vinylidene chloride copolymer resin is used as the coating agent, the contact angle of the coated surface to water (20° C.) is 80° to 95°, and therefore, if an aqueous or water-alcohol mixture type lamination adhesive is used, the adhesive is repelled from the coated surface or the lamination strength is insufficient.

As the method for eliminating these disadvantages, there can be mentioned a method (1) in which an alcohol is incorporated into an aqueous ink or aqueous lamination adhesive or the proportion of the alcohol incorporated into such ink or adhesive is increased, whereby the wettability of the ink or adhesive is improved. This method (1), however, is disadvantageous from the viewpoint of the cost. As the method for improving the wettability of a coated film, there can be mentioned a method (2-A) in which the surface of the coated film is coated with a surface active agent. Although the wettability of the coated film is improved according to this method (2-A), the applicable range of the coated amount is narrow in this method (2-A), and the ink adhesion after printing is insufficient or the lamination strength is poor. Furthermore, since the step of coating the surface of the coated film with the surface active agent is added, the method (2-A) is disadvantageous from the viewpoint of the cost. As another method, there can be mentioned a method (2-B) in which a surface active agent is incorporated into a coating solution. Although this method (2-B) is advantageous from the viewpoint of the cost, no satisfactory recipe has been developed.

Under such background, we made studies of various kinds of surface active agents, and found that if a specific surface active agent is incorporated into a coating solution in a specific amount, the intended objects can be attained satisfactorily and this method is industrially very effective. We have now completed the present invention based on this finding.

The coated film prepared according to the present invention has a highly improved wettability to an aqueous or water-alcohol mixture type ink or lamination adhesive and therefore, good ink adhesion and lamination strength are obtained. Furthermore, the coated film of the present invention is excellent in the non-fogging property.

This invention relates to a coated film comprising a film and a coating formed thereon by coating the film with a coating solution comprising as a main component a composition comprising 100 parts by weight of a vinylidene chloride type copolymer resin and 0.3 to 5.0 parts by weight of at least one member selected from the group consisting of surface active agents of the following formulae (A), (B), (C), (D), (E), (F) and (G):

(A)

wherein R stands for an alkyl or alkenyl group having 8 to 20 carbon atoms, m is a number of from 4 to 30 and n is 2 or 3, (B) compounds represented by the following formula:

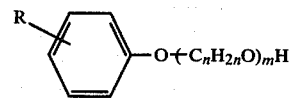

wherein R stands for an alkyl or alkenyl group having 8 to 10 carbon atoms, m is a number of from 4 to 30 and n is 2 or 3, (C) compounds represented by the following formula:

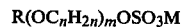

wherein R stands for an alkyl or alkenyl group having 8 to 20 carbon atoms, m is a number of from 4 to 30, n is 2 or 3 and M is Na, K, Ca or $NH_4$, (D) compounds represented by the following formula:

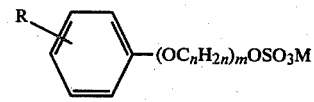

wherein R stands for an alkyl or alkenyl group having 8 to 10 carbon atoms, m is a number of from 4 to 30, n is 2 or 3 and M is Na, K, Ca or $NH_4$, (E) compounds represented by the following formula:

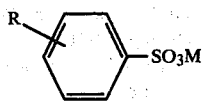

wherein R stands for an alkyl or alkenyl group having 8 to 20 carbon atoms and M is Na, K, Ca, Mg, or NH$_4$, (F) compounds represented by the following formula:

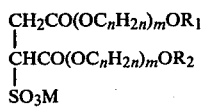

wherein R$_1$ and R$_2$ stand for an alkyl group having 4 to 16 carbon atoms, m is a number of from 0 to 5, n is 2 or 3 and M is Na, K, Ca or NH$_4$, and (G) compounds represented by the following formula:

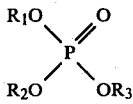

wherein R$_1$, R$_2$ and R$_3$ stand for an alkyl group having 1 to 8 carbon atoms or an octylphenyl, nonylphenyl or dodecylphenyl group.

The coating solution to be used in the invention may comprise an aqueous dispersion or a solution in a solvent.

In the formulae, (B), (D) and (E), it is preferred that R is located at the para-position of the benzene ring.

The invention as defined before contains two preferable embodiments, the first aspect and the second aspect which will be illustrated hereinafter.

As the surface active agent that is used in the first aspect of the present invention, there can be mentioned alkylbenzene-sulfonate salts represented by the following formula [E]:

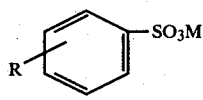

wherein R stands for an alkyl group having 10 to 20 carbon atoms and M stands for Na, K, Ca, Mg or NH$_4$, and ester sulfonate salts represented by the following formula [F]:

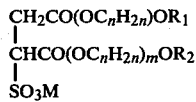

wherein R$_1$ stands for an alkyl group having 4 to 16 carbon atoms, R$_2$ stands for an alkyl group having 4 to 16 carbon atoms, m is a number of from 0 to 5, n is 2 or 3, and m is Na, K, Ca or NH$_4$.

As specific examples of the alkylbenzene-sulfonate salt, there can be mentioned ammonium dodecylbenzene-sulfonate, sodium dodecylbenzene-sulfonate, potassium dodecylbenzene-sulfonate, calcium dodecylbenzene-sulfonate and magnesium dodecylbenzene-sulfonate, and as the ester sulfonate salt, there can be mentioned, for example, sodium, potassium, calcium and ammonium salts of dibutyl sulfosuccinate and ethylene oxide adducts (P=1 to 5 moles) and propylene oxide adducts (P=1 to 5 moles) thereof.

The sulfonate type anionic surface active agent of the first aspect is incorporated into the coating solution in an amount of 0.3 to 3.0 parts by weight, preferably 0.8 to 1.5 parts by weight, per 100 parts by weight of the solid of the vinylidene chloride resin as the main resin component in the coating solution. If the amount of the surface active agent is smaller than 0.3 part by weight per 100 parts by weight of the vinylidene chloride resin, the effect of improving the wettability is insufficient, and if the amount of the activator is larger than 3.0 parts by weight per 100 parts by weight of the vinylidene chloride resin, the printing ink adhesion and the strength of adhesion to a polyethylene or polypropylene film are degraded.

As the vinylidene chloride type copolymer that is used in the present invention, there can be mentioned, for example, a vinylidene chloride/vinyl chloride copolymer, a vinylidene chloride/acrylonitrile copolymer, a vinylidene chloride/acrylic acid ester copolymer, a vinylidene chloride/methacrylic acid ester copolymer, and these copolymers further comprising acrylic acid, methacrylic acid, crotonic acid and other unsaturated carboxylic acids and unsaturated dicarboxylic acids as tertiary and quaternary components.

From the viewpoint of the gas barrier property to oxygen gas and water vapor, it is preferred that the content of vinylidene chloride in the vinylidene chloride type copolymer be at least 85 mole %. Since a vinylidene chloride homopolymer is unstable and is hardly soluble in a solvent, from the practical viewpoint, it is preferred that the vinylidene chloride content be up to 97 mole %.

An additive such as a lubricant, a wax, a stabilizer, a dye or a plasticizer may be incorporated into a coating solution comprising the above-mentioned vinylidene chloride type copolymer as the main component.

As the solvent to be used for forming a coating solution by adding the vinylidene chloride type copolymer resin thereto, there can be mentioned tetrahydrofuran, methylethyl ketone, acetone, methylisobutyl ketone, toluene and ethyl acetate. Furthermore, there may be used a mixed solvent of two or more thereof.

Even if the vinylidene chloride type copolymer resin is used in the form of an aqueous dispersion, the intended effects of the present invention can similarly be attained.

The surface active agent of the present invention may be added at the polymerization step of forming the vinylidene chloride type copolymer resin.

As the film that is used in the present invention, there can be mentioned drawn and undrawn films of polyethylene, polypropylene, poly-4-methylpentene-1, polyethylene terephthalate, polyethylene terephthalate/isophthalate, nylon 6, nylon 66, nylon 12 and regenerated cellulose. Furthermore, there may be used glassine paper and tissue paper. A biaxially drawn thermoplastic resin film, especially a biaxially drawn polypropylene film, is especially preferred. Incidentally, these films may comprise additives such as an antistatic agent, a lubricant, a stabilizer and an anti-blocking agent.

Various surface treatment methods for treating surfaces of films to be coated are known. These methods, such as a corona treatment method, a high frequency treatment, a flame treatment method, a chromium mixed liquid treatment method and an anchoring coating treatment can be adopted in the present invention.

At the coating step, the coating solution may be heated or may not be heated. Any of known film-coating methods such as a dip coating method, a gravure coating method, a reverse roll coating method, a Meyer bar coating method, a die coating method and an air knife coating method may be adopted. The thickness of the resulting coating is 1 to $10\mu$ and preferably 2 to $4\mu$.

The present invention will now be described in detail with reference to the following Examples that by no means limit the scope of the present invention. The properties of coated films were determined according to the following methods.

Oxygen Gas Permeability:

The oxygen gas permeability was measured at 20° C. by using oxygen gas having a moisture content of 0% and helium gas as a compensating gas according to the gas chromatography method (measuring device: Lyssy Gas Permeability Testing Apparatus).

Water Vapor Permeability:

The water permeability was measured at a temperature of 40° C. and a relative humidity of 90% by using a cup designated by JIS Z-0208.

Tape Test:

A method similar to the customary Scotch tape test was adopted. A pressure-sensitive adhesive cellophane tape having a size of 24 mm×200 mm was tightly bonded to the resin-coated surface and the tape was violently peeled at an angle of 90°. The state of peeling of the coating was examined and the evaluation was conducted according to the following scale:
  o: no peeling of the coating
  x: coating-peeled area of more than 20%
  Δ: coating-peeled area of up to 20%

Printing Tape Test:

The coated surface was printed with GNC-ST ink (supplied by Toyo Ink Kabushiki Kaisha), which contains a mixed binder of a polyamide and nitrocellulose, and the printed surface was subjected to the above-mentioned tape test. The state of peeling of the printed surface was examined and the evaluation was conducted according to the following scale:
  o: no peeling of the printed surface
  x: peeled area of more than 20%
  Δ: peeled area of up to 20%

Contact Angle to Water (20° C.):

A water drop in an amount of about 0.05 g was let fall down on the coated surface and the contact angle between the coated surface and the water drop was measured by using a microscope.

EXAMPLES 1 THROUGH 3 AND COMPARATIVE EXAMPLES 1 AND 2

Coronate L (supplied by Nippon Polyurethane Kabushiki Kaisha) was coated as an undercoating agent in an amount of 0.2 g/m² after drying on a corona-treated surface of a biaxially drawn polypropylene film (wet tension=41 dyne/cm), and the film was dried and a coating solution A, B or C shown in Table 1 was coated in an amount of 1.9 g/m² after drying. The coated film was then dried at 105° C. for 60 seconds. For comparison, a coating solution D or E shown in Table 1 was coated on the same undercoating agent-coated, biaxially drawn polypropylene film as used in Examples 1 through 3, and the coated film was dried. The properties of the obtained coated films are shown in Table 2.

Incidentally, in each of the coating solutions A through E, contents of the components are expressed as weight ratios of the solids.

TABLE 1

| | Coating Solution A | Coating Solution B | Coating Solution C | Coating Solution D | Coating Solution E |
|---|---|---|---|---|---|
| Vinylidene chloride/vinyl chloride Copolymer resin (89/11) | 100 | 100 | 100 | 100 | 100 |
| Wax (melting point = 78° C.) | 1.0 | 1.0 | 1.0 | 1.0 | 1.0 |
| Lubricant (silica powder having average particle size of $3\mu$) | 0.1 | 0.1 | 0.1 | 0.1 | 0.1 |
| Ammonium dodecyl-benzene-sulfonate | 0.5 | 1.0 | 2.0 | 3.5 | 0 |
| Tetra hydro furan | 250 | 250 | 250 | 250 | 250 |
| Toluene | 250 | 250 | 250 | 250 | 250 |

TABLE 2

| Coating Solution | Example 1 A | Example 2 B | Example 3 C | Comparative Example 1 D | Comparative Example 2 E |
|---|---|---|---|---|---|
| Amount Coated (g/m²) | 1.8 | 1.7 | 1.9 | 1.6 | 1.7 |
| Contact Angle to Water (20° C.) | 73 | 66 | 52 | 38 | 84 |
| Tape Test | 0 | 0 | 0 | Δ | 0 |
| Printing Tape Test | 0 | 0 | 0 | X | 0 |
| O₂-TR (CC/m² · atm · day) | 9 | 11 | 13 | 18 | 8 |
| WVTR (g/m² · atm · day) | 5.6 | 5.6 | 6.1 | 7 | 5.5 |

EXAMPLE 4 AND COMPARATIVE EXAMPLE 3

Low-density polyethylene was extrusion-laminated in a thickness of $60\mu$ on the coated surface of the coated film obtained in Example 2 or Comparative Example 2. Toyobin K (supplied by Toyo Soda Kabushiki Kaisha) was used as a lamination adhesive after it had been diluted with water or a water/methyl alcohol mixture (90/10 weight ratio) so that the theoretical coated amount (calculated from the amount used) after drying was 15 to 30 mg/m². The lamination strength of each laminated film was measured to obtain results shown in Table 3.

TABLE 3

| | Coated Film | Diluent for Lamination Adhesive | Wettability to Lamination Adhesive | Lamination Strength (g/25mm) |
|---|---|---|---|---|
| Example | Coated Film of | Water | no | 270 |

TABLE 3-continued

| | Coated Film | Diluent for Lamination Adhesive | Wettability to Lamination Adhesive | Lamination Strength (g/25mm) |
|---|---|---|---|---|
| 4 | Example 2 | | repelling | |
| | | Water/Methyl Alcohol (80/20) | no repelling | 276 |
| Comparative Example 3 | Coated Film of Comparative Example 2 | Water | Slight repelling | — |
| | | Water/Methyl Alcohol (80/20) | no repelling | 230 |

EXAMPLES 5 THROUGH 7 AND COMPARATIVE EXAMPLES 4 AND 5

A biaxially drawn polyethylene terephthalate film having a thickness of 16μ was coated with the same undercoating agent as used in Example 2 and Comparative Example 2 and was then dried. Then, the coating solution B or E shown in Table 1 was coated on the film and the coated film was dried. The properties of the obtained coated films are shown in Table 4.

TABLE 4

| | Example 5 | Example 6 | Example 7 | Comparative Example 4 | Comparative Example 5 |
|---|---|---|---|---|---|
| Coating Solution | B | B | B | E | E |
| Amount Coated | 1.2 | 2.5 | 3.3 | 2.7 | 3.6 |
| Contact Angle to Water (20° C.) | 68 | 64 | 59 | 86 | 92 |
| Tape Test | 0 | 0 | 0 | 0 | 0 |
| Printing Tape Test | 0 | 0 | 0 | 0 | 0 |
| $O_2$-TR (cc/$m^2$ · atm · day) | 12 | 6.8 | 5.8 | 6.5 | 5.2 |
| WVTR (g/$m^2$ · atm · day) | 5.8 | 5.4 | 5.0 | 5.2 | 4.7 |

EXAMPLE 8 AND COMPARATIVE EXAMPLE 6

The same undercoating agent-coated, biaxially drawn polypropylene film as used in Examples 1 through 4 was coated with a coating solution F or G shown in Table 5 and the coated film was dried. The properties of the obtained coated films are shown in Table 6.

Incidentally, the recipe of each coating solution is shown by the weight ratios of the respective components as solids.

TABLE 5

| | Coating Solution F | Coating Solution G |
|---|---|---|
| Vinylidene chloride/acrylonitrile copolymer resin (91/9) | 100 | 100 |
| Wax (melting point = 78° C.) | 1.0 | 1.0 |
| Lubricant (silica powder having average particle size of 3μ) | 0.1 | 0.1 |
| Sodium dialkyl-sulfosuccinate | 1.0 | 0 |
| Tetrahydrofuran | 250 | 250 |
| Toluene | 250 | 250 |

TABLE 6

| Coating Solution | Example 8 F | Comparative Example 6 G |
|---|---|---|
| Amount Coated | 3.2 | 3.5 |
| Contact Angle to Water (20° C.) | 67 | 93 |
| Tape Test | 0 | 0 |
| Printing Tape Test | 0 | 0 |
| $O_2$-TR (cc/$m^2$ · atm · day) | 6.1 | 5.3 |
| WVTR (g/$m^2$ atm · day) | 5.2 | 4.6 |

EXAMPLE 9

The coated surface of the coated film obtained in Example 8 was printed with GNC-ST ink (supplied by Toyo Ink Kabushiki Kaisha), and Toyobin 210 (lamination adhesive supplied by Toyo Soda Kabushiki Kaisha) was coated to the printed surface after said adhesive had been diluted with water/methanol (90/10 weight ratio) so that the amount coated was about 0.030 g/$m^2$. The coated film was then dried and low-density polyethylene was extrusion-laminated in a thickness of 60μ on the coated film. The lamination strength of the obtained laminated film was 255 g/25 mm.

In accordance with the second aspect of the present invention, there is provided a process for the preparation of coated films which comprises coating a film with a coating solution containing 100 parts by weight of a vinylidene chloride type copolymer resin and, incorporated therein, (a) 0.3 to 5 parts by weight of a specific surface active agent and (b) 1 to 8 parts by weight of an isocyanate compound and drying the coated film, and a coated film obtained according to this process, which has a good printability and is excellent in the oxygen gas barrier property, the water vapor barrier property, the slip characteristic and transparency.

Almost all kinds of ink which have been used for the purpose of printing on conventional coated film contain a mixture of nitrocellulose and a polyamide as a binder. Also such a kind of ink as contains nitrocellulose as the main binder, and an aqueous ink which has an acrylic resin or a maleic resin as the main binder have recently been used for this purpose. The former ink provides an economic advantage, in comparison with the ink containing the mixed binder of nitrocellulose and a polyamide. The latter has such an advantage that no organic solvent is used, because this is desirable in view of both safety and the economic viewpoints and the resulting coated film does not have an organic solvent remaining thereon.

When a film which has been coated with a coating solution comprising a vinylidene chloride copolymer having a vinylidene chloride content of not less than 85 mole percent in an organic solvent is printed with an ink the binder of which is a mixture of nitrocellulose and a polyamide, the adhesion property to the ink is found to be good. On the other hand, when the same coated film as above is printed with an ink having nitrocellulose as the main binder, the adhesion property to the ink is insufficient. Also the coated film provides only insufficient adhesion to an aqueous ink.

As the method for improving the adhesion of a coated film to an ink comprising nitrocellulose as a main binder, there has been proposed a method in which a resin-coated, moisture-proof film is coated with a primer containing an isocyanate or isocyanurate compound (see Japanese Patent Application Laid-Open Specification No. 154418/77). According to this method, a substance having a good adhesion to either a vinylidene chloride type copolymer resin or an ink is coated on the coated surface of a coated film. Therefore, the number of steps is increased in this method and the method is disadvantageous from the economic viewpoint. As compared with this known method, the above-mentioned method of the present invention is economically advantageous. When an isocyanate compound alone is incorporated in a coating solution comprising a vinylidene chloride type resin as the main component, it is difficult to obtain a coated film excellent in the adhesion to an ink comprising nitrocellulose as a main binder, the oxygen gas barrier property, the water vapor barrier property, the slip characteristic and the transparency, such as the coated film provided according to the second aspect of the present invention.

As the surface active agent (a) that is used in the second aspect of the present invention, there can be mentioned (A) compounds represented by the following formula:

RO(C$_n$H$_{2n}$O)$_m$H wherein R stands for an alkyl or alkenyl group having 8 to 20 carbon atoms, m is a number of from 4 to 30 and n is 2 or 3, (B) compounds represented by the following formula:

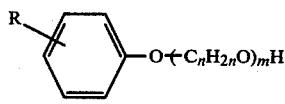

wherein R stands for an alkyl or alkenyl group having 8 to 10 carbon atoms, m is a number of from 4 to 30 and n is 2 or 3, (C) compounds represented by the following formula:

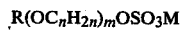
R(OC$_n$H$_{2n}$)$_m$OSO$_3$M wherein R stands for an alkyl or alkenyl group having 8 to 20 carbon atoms, m is a number of from 4 to 30, n is 2 or 3 and M is Na, K, Ca or NH$_4$, (D) compounds represented by the following formula:

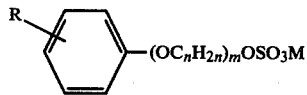

wherein R stands for an alkyl or alkenyl group having 8 to 10 carbon atoms, m is a number of from 4 to 30, n is 2 or 3 and M is Na, K, Ca or NH$_4$, (E) compounds represented by the following formula:

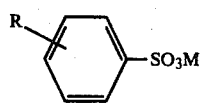

wherein R stands for an alkyl or alkenyl group having 8 to 20 carbon atoms and M is Na, K, Ca or NH$_4$, (F) compounds represented by the following formula:

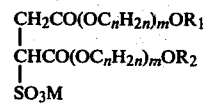

wherein R$_1$ and R$_2$ stand for an alkyl group having 4 to 16 carbon atoms, m is a number of from 0 to 5, n is 2 or 3 and M is Na, K, Ca or NH$_4$, and (G) compounds represented by the following formula:

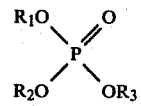

wherein R$_1$, R$_2$ and R$_3$ stand for an alkyl group having 1 to 8 carbon atoms or an octylphenyl, nonylphenyl or dodecylphenyl group.

In the formulae (B), (D) and (E) as above, it is preferred that R is located at the para-position of the benzene ring.

The amount of the surface active agent incorporated into the coating solution comprising the vinylidene chloride type resin as the main component is 0.3 to 5 parts by weight, preferably 1.0 to 2.0 parts by weight, per 100 parts by weight of the vinylidene chloride type resin. If the amount of the surface active agent is smaller than 0.3 part by weight per 100 parts by weight of the vinylidene chloride type resin, the adhesion to either an ink comprising nitrocellulose as a main binder or an aqueous ink is insufficient. If the amount of the surface active agent is larger than 5 parts by weight per 100 parts by weight of the vinylidene chloride type resin, the adhesion to the above-mentioned inks is insufficient, and the barrier property to oxygen gas or water vapor is reduced.

The above-mentioned surface active agents may be used singly or in the form of a mixture of two or more thereby.

As the isocyanate compound (6) that is used in the present invention, there can be mentioned (i) an adduct derived from 1 mole of trimethylol propane and 3 moles of tolylene diisocyanate, (ii) an adduct derived from 1 mole of trimethylol propane and 3 moles of hexamethylene diisocyanate and (iii) a trimer of hexamethylene diisocyanate.

The isocyanate compound is incorporated into the coating solution comprising the vinylidene chloride type resin as the main component in an amount of 1.0 to 8.0 parts by weight, preferably 2.0 to 5.0 parts by weight, per 100 parts by weight of the vinylidene chloride type resin. If the amount of the isocyanate compound is smaller than 1.0 part by weight per 100 parts by weight of the vinyl chloride type resin, the adhesion to either an ink comprising nitrocellulose as a main binder or an aqueous ink is insufficient. If the amount of the isocyanate compound is larger than 8.0 parts by weight per 100 parts by weight of the vinylidene chloride type resin, the barrier property of the coated film to oxygen gas or water vapor is reduced.

The evaluation methods adopted in the following Examples and Comparative Examples will now be described.

Water Vapor Permeability:

The water permeability was measured at a temperature of 40° C. and a relative humidity of 90% by using a cup designated by JIS Z-0208.

Oxygen Gas Permeability:

The oxygen gas permeability was measured at 20° C. by using oxygen gas having a moisture content of 0% and helium gas as a compensating gas according to the gas chromatography method (measuring device: Lyssy Gas Permeability Testing Apparatus).

Slip Characteristic:

The measurement was conducted according to the method of ASTM D-1894-63, and the dynamic friction coefficient was measured.

Transparency:

The transparency was evaluated with the naked eye according to the following scale:
excellent: good transparency
fair: slightly whitish
bad: white and no transparency Printability:

The coated surface was printed with (1) an ink comprising nitrocellulose as a main binder or (2) an aqueous ink, and an adhesive cellophane tape (supplied by Nichiban Kabushiki Kaisha; 24 mm in width) was applied to the printed surface. Then, the adhesive cellophane tape was violently peeled and the printed surface was observed. Evaluation was conducted according to the following scale:
excellent: printed surface hardly peeled
fair: slight peeling of printed surface
bad: substantial peeling of printed surface

EXAMPLES 10 THROUGH 12

A coating solution H having a composition indicated below was coated on the corona discharge-treated surface (the treated surface having a wet tension of 38 dyne/cm) of a biaxially drawn polypropylene film having a thickness of $20\mu$ by means of a gravure coater, and the coated surface was dried at 110° C. for 30 seconds.

Then, the coated surface of the coated film was printed with an ink comprising nitrocellulose as a main binder (CC-ST INK Supplied by Toyo Ink Kabushiki Kaisha) by using a gravure roll having a gravure printing plate having a depth of $15\mu$, and the printed surface was dried at 80° C. for 10 seconds.

The properties and printability of the coated film were evaluated to obtain results shown in Table 7.

| Coating Solution H | |
| --- | --- |
| Vinylidene chloride/acrylonitrile (86/14 molar ratio) copolymer resin | 100 parts by weight |
| Isocyanate compound (adduct derived from 1 mole of trimethylol propane and 3 moles of hexamethylene diisocyanate) | 4 parts by weight |
| Surface active agent (sodium dialkylsulfosuccinate) | 1.5 parts by weight |
| Wax (melting point = 78° C.) | 1.0 part by weight |
| Finely divided silica (average particle size = $3\mu$) | 0.15 part by weight |
| Tetrahydrofuran | 260 parts by weight |
| Toluene | 260 parts by weight |

EXAMPLE 13 AND COMPARATIVE EXAMPLES 7 AND 8

A coated film was prepared in the same manner as described in Examples 10 through 12 by using a coating solution I having the same composition as that of the coating solution H used in Examples 10 through 12 except that the adduct derived from 1 mole of trimethylol propane and 3 moles of hexamethylene diisocyanate and sodium dialkylsuffosuccinate were not used, a coating solution J having the same composition as that of the coating solution H except that said trimethylol propane/hexamethylene diisocyanate adduct was not added and a coating solution K having the same composition as that of the coating solution H except that sodium dialkylsulfosuccinate was not added. The coated film was tested in the same manner as in Examples 10 through 12. The obtained results are shown in Table 7.

TABLE 7

| Coating Solution | Example 10 H | Example 11 H | Example 12 H | Comparative Example 7 I | Example 13 J | Comparative Example 8 K |
| --- | --- | --- | --- | --- | --- | --- |
| Isocyanate compound* | added | added | added | not added | not added | added |
| Surface active agent** | added | added | added | not added | added | not added |
| Amount coated (g/m²) | 1.5 | 2.6 | 3.4 | 2.6 | 2.7 | 2.5 |
| Slip characteristic | 0.36 | 0.28 | 0.23 | 0.27 | 0.26 | 0.27 |
| Oxygen gas permeability (cc/m² · atm · day) | 16 | 10 | 7 | 9 | 9 | 10 |
| Water vapor permeability (g/m² · atm · day) | 7.1 | 6.0 | 5.5 | 5.8 | 6.0 | 6.3 |
| Printability | excellent | excellent | excellent | bad | bad | bad |
| Transparency | excellent | excellent | excellent | excellent | excellent | excellent |

Notes:
*adduct derived from 1 mole of trimethylol propane and 3 moles of hexamethylene diisocyanate
**sodium dialkylsulfosuccinate

EXAMPLE 13 AND COMPARATIVE EXAMPLE 9

The coated surface of the coated film obtained in Example 11 or Comparative Example 7 was printed with an aqueous ink comprising an acrylic resin as a main binder (JW34 Aqua Color supplied by Toyo Ink Kabushiki Kaisha) by using a gravure roll having a gravure printing plate having a depth of 10μ, and the printed surface was dried at 80° C. for 15 seconds. The printability was evaluated to obtain results shown in Table 8.

TABLE 8

|  | Example 13 | Comparative Example 9 |
|---|---|---|
| Coated film | Example 11 | Comparative Example 7 |
| Printability (with aqueous ink) | excellent | fair - bad |

EXAMPLES 14 THROUGH 18

A coating solution L having a composition indicated below was coated to the surface, which had been corona discharge-treated in the same manner as in Examples 10 through 12, of a biaxially drawn polypropylene film having a thickness of 20μ, and the coated surface was dried at 110° C. for 30 seconds.

In the same manner as described in Examples 10 through 12, the coated surface was printed with an ink comprising nitrocellulose as a main binder (CC-ST INK supplied by Toyo Ink Kabushiki Kaisha) and the printed surface was dried. The properties and printability of the coated film were evaluated to obtain results shown in Table 9. Separately, in the same manner as described in Example 14, the coated surface was printed with an aqueous ink (JW34 Aqua Color supplied by Toyo Ink Kabushiki Kaisha) and dried, and the printability was evaluated to obtain results shown in Table 9.

| Coating Solution L | |
|---|---|
| Vinylidene chloride/vinyl chloride/ethyl acrylate copolymer resin (88/8/4 molar ratio) | 100 parts by weight |
| Isocyanate compound (adduct derived from 1 mole of trimethylol propane and 3 moles of hexamethylene diisocyanate) | see Table 9 |
| Surface active agent (sodium dialkylsulfosuccinate) | see Table 9 |
| Wax (melting point = 78° C.) | 1.5 parts by weight |
| Finely divided silica (average particle size = 3μ) | 1.0 part by weight |
| Tetrahydrofuran | 360 parts by weight |
| Toluene | 180 parts by weight |

COMPARATIVE EXAMPLES 10 THROUGH 13

In the same manner as described in Examples 14 through 18, the corona discharge-treated surface of a biaxially drawn propylene film having a thickness of 20μ was coated with the coating solution L and the coated surface was printed. The properties and printability of the coated film were evaluated to obtain results shown in Table 9.

TABLE 9

| | Comparative Example 10 | Example 14 | Example 15 | Example 16 | Comparative Example 11 | Comparative Example 12 | Example 17 | Example 18 | Comparative Example 13 |
|---|---|---|---|---|---|---|---|---|---|
| Coating solution | L | L | L | L | L | L | L | L | L |
| Amounts (parts by weight) of isocyanate compound* | 4 | 4 | 4 | 4 | 4 | 0.5 | 2 | 8 | 16 |
| Amount (parts by weight) of surface active agent** | 0.2 | 0.5 | 2 | 5 | 8 | 1 | 1 | 1 | 1 |
| Amount coated (g/m²) | 2.7 | 2.7 | 2.5 | 2.8 | 2.9 | 2.6 | 2.9 | 2.7 | 2.4 |
| Slip characteristic | 0.28 | 0.29 | 0.27 | 0.25 | 0.24 | 0.28 | 0.27 | 0.29 | 0.31 |
| Oxygen gas permeability (cc/m² · atm · day) | 8 | 8 | 9 | 8 | 10 | 8 | 7 | 12 | 30 |
| Water vapor permeability (g/m² · atm · day) | 5.8 | 5.7 | 6.0 | 6.2 | 6.4 | 5.8 | 5.9 | 6.4 | 6.8 |
| Printability (ink comprising nitrocellulose as main binder) | bad | excellent | excellent | excellent | fair | bad | excellent | excellent | excellent |
| Printability (aqueous ink) | bad | excellent | excellent | excellent | fair-bad | bad | excellent | excellent | excellent |
| Transparency | excellent | excellent | excellent | excellent | excellent | excellent | excellent | excellent | excellent |

Notes:
*adduct derived from 1 mole of trimethylol propane and 3 moles hexamethylene diisocyanate
**sodium dialkylsulfosuccinate

EXAMPLES 19 THROUGH 22

A coating solution was prepared in the same manner as described in Examples 10 through 12 except that a surface active agent shown in Table 10 was used instead of sodium dialkylsulfosuccinate in the coating solution H used in Examples 10 through 12. A coated film was prepared in the same manner as described in Examples 10 through 12 by using the so-prepared coating solution. The properties and printability of the coated film were evaluated to obtain results shown in Table 10.

TABLE 10

|  | Example 19 | Example 20 | Example 21 | Example 22 |
|---|---|---|---|---|
| Surface active agent used | polyoxyethylene lauryl ether (HLB = 10.5) | polyoxyethylene octylphenyl ether (HLB = 13.1) | sodium polyoxyethylene alkylphenylsulfate | nonylphenoxypolyethoxyphosphoric acid |
| Amount coated (g/m$^2$) | 2.5 | 2.6 | 2.8 | 2.4 |
| Slip characteristic | 0.25 | 0.26 | 0.26 | 0.25 |
| Oxygen gas permeability (cc/m$^2$ · atm · day) | 9 | 8 | 8 | 9 |
| Water vapor permeability (g/m$^2$ · atm · day) | 6.2 | 6.2 | 6.1 | 6.5 |
| Printability (ink comprising nitrocellulose as main binder) | excellent | excellent | excellent | excellent |
| Transparency | excellent | excellent | excellent | excellent |

EXAMPLES 23 AND 24

A coating solution was prepared in the same manner as described in Examples 10 through 12 except that an isocyanate compound shown in Table 11 was used instead of the adduct derived from 1 mole of trimethylol propane and 3 moles of hexamethylene diisocyanate in the coating solution H used in Examples 10 through 12, and a coated film was prepared in the same manner as described in Examples 10 through 12 by using the so-prepared coating solution. The properties and printability of the coated film were evaluated to obtain results shown in Table 11.

TABLE 11

|  | Example 23 | Example 24 |
|---|---|---|
| Isocyanate compound used | trimer of hexamethylene diisocyanate | adduct derived from 1 mole of trimethylol propane and 3 moles of hexamethylene diisocyanate |
| Amount coated (g/m$^2$) | 2.5 | 2.8 |
| Slip characteristic | 0.24 | 0.23 |
| Oxygen gas permeability (cc/m$^2$ · atm · day) | 9.2 | 9.0 |
| Water vapor permeability (g/m$^2$ · atm · day) | 6.3 | 6.0 |
| Printability (ink comprising nitrocellulose as main binder) | excellent | excellent |
| Printability (aqueous ink) | excellent | excellent |
| Transparency | excellent | excellent |

EXAMPLE 25

A biaxially drawn polyethylene terephthalate film having a thickness of 12μ was coated with the coating solution H used in Examples 10 through 12 by using a gravure coater so that the coated amount after drying was 2.5 g/m$^2$, and the coated film was dried at 110° C. for 60 seconds. The properties and printability of the obtained coated film were evaluated to obtain results shown in Table 12.

TABLE 12

| Coating solution | Example 25 H |
|---|---|
| Amount coated (g/m$^2$) | 2.7 |
| Slip characteristic | 0.24 |
| Oxygen gas permeability (cc/m$^2$ atm day) | 7.6 |
| Water vapor permeability (g/m$^2$ atm day) | 10.8 |
| Printability (ink comprising nitrocellulose as main binder) | excellent |
| Printability (aqueous ink) | excellent |

TABLE 12-continued

| Coating solution | Example 25 H |
|---|---|
| Transparency | excellent |

The embodiments of the invention in which an exclusive property or privilege is claimed are defined as follows:

1. A coated film comprising a film and a coating formed thereon by coating said film with a coating solution consisting essentially of (a) 100 parts by weight of a copolymer of vinylidene chloride and at least one other monomer copolymerizable therewith, said copolymer containing from 85 to 97 mole percent of vinylidene chloride monomer units; (b) from 1.0 to 8.0 parts by weight of an isocyanate compound; (c) from 0.3 to 5.0 parts by weight of at least one member selected from the group consisting of surface active agents of the following formulas (A), (B), (C), (D), (E), (F) and (G):

$$RO(C_nH_{2n}O)_mH \qquad (A)$$

wherein R is alkyl or alkenyl having 8 to 20 carbon atoms, m is a number of from 4 to 30, and n is 2 or 3,

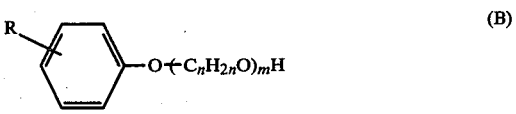
(B)

wherein R is alkyl or alkenyl having 8 to 10 carbon atoms, m is a number of from 4 to 30, and n is 2 or 3, $$R(OC_nH_{2n})_mOSO_3M \qquad (C)$$

wherein R is alkyl or alkenyl having 8 to 20 carbon atoms,
m is a number of from 4 to 30, n is 2 or 3, and M is Na, K, Ca or NH$_4$,

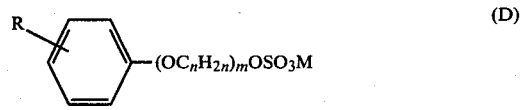
(D)

wherein R is alkyl or alkenyl having 8 to 10 carbon atoms, m is a number of from 4 to 30, n is 2 or 3 and M is Na, K, Ca or NH$_4$,

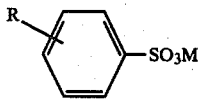 (E)

wherein R is alkyl or alkenyl having 8 to 20 carbon atoms and M is Na, K, Ca or NH$_4$,

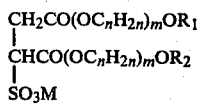 (F)

wherein R$_1$ and R$_2$ each is alkyl having 4 to 16 carbon atoms, m is a number of from 0 to 5, n is 2 or 3, and M is Na, K, Ca or NH$_4$, and 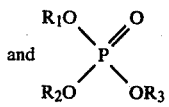 (G)

wherein R$_1$, R$_2$ and R$_3$ each is alkyl having 1 to 8 carbon atoms or an octylphenyl, nonylphenyl or dodecylphenyl group; and the balance is essentially an organic solvent.

2. A coated film as claimed in claim 1, in which the amount of said surface active agent (C) is 0.3 to 3.0 parts by weight and said surface active agent is selected from the group consisting of surface active agents of the formula (E) and (F), with the proviso that R of formula (E) is alkyl having 10 to 20 carbon atoms and is attached in the para-position of the benzene ring.

3. A coated film as claimed in claim 1, wherein said coating solution contains from 1 to 2 parts by weight of said surface active agent (c), and from 2 to 5 parts by weight of said isocyanate compound (b).

4. A coated film as claimed in claim 1, wherein said isocyanate compound is selected from the group consisting of an adduct of one mole of trimethylol propane and 3 moles of tolylene diisocyanate, an adduct of one mole of trimethylol propane and 3 moles of hexamethylene diisocyanate, and a trimer of hexamethylene diisocyanate.

5. A coated film as claimed in claim 1, wherein said surface active agent is selected from the group consisting of said surface active agents (F) wherein m is zero.

* * * * *